United States Patent
Jeansonne et al.

(10) Patent No.: US 7,993,414 B2
(45) Date of Patent: Aug. 9, 2011

(54) PORTABLE COMPUTING SYSTEM DOCKING SECURITY SYSTEM AND METHOD

(75) Inventors: Jeffrey Kevin Jeansonne, Houston, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1090 days.

(21) Appl. No.: 11/656,639

(22) Filed: Jan. 23, 2007

(65) Prior Publication Data

US 2008/0178304 A1 Jul. 24, 2008

(51) Int. Cl.
 *G08B 13/00* (2006.01)
 *G08B 29/00* (2006.01)
(52) U.S. Cl. .......................................... 726/35; 726/34
(58) Field of Classification Search .............. 726/34–36; 116/4–6, 75, 77; 340/500–502, 568.1–568.4
 See application file for complete search history.

(56) References Cited

U.S. PATENT DOCUMENTS

| | | | | |
|---|---|---|---|---|
| 5,668,977 | A * | 9/1997 | Swanstrom et al. | 703/23 |
| 5,878,211 | A * | 3/1999 | Delagrange et al. | 726/34 |
| 5,911,777 | A * | 6/1999 | Heredia | 726/35 |
| 6,609,207 | B1 | 8/2003 | Cromer et al. | |
| 7,024,700 | B1 * | 4/2006 | Horikoshi et al. | 726/34 |
| 7,026,933 | B2 | 4/2006 | Kim | |
| 2001/0011947 | A1 * | 8/2001 | Jaber et al. | 340/568.1 |
| 2002/0171546 | A1 * | 11/2002 | Evans et al. | 340/540 |
| 2006/0005264 | A1 * | 1/2006 | Lin et al. | 726/35 |

FOREIGN PATENT DOCUMENTS

| | | |
|---|---|---|
| KR | 10-2001-0001221 A | 1/2001 |
| KR | 10-2002-0001294 A | 1/2002 |
| WO | 00-41058 A1 | 7/2000 |

OTHER PUBLICATIONS

PCT International Search Report and Written Opinion of the International Searching Authority, having a date of mailing of Jun. 24, 2008, in co-pending PCT International Patent Application No. PCT/US2008/000725 having an International Filing Date of Jan. 17, 2008 with the applicant being Hewlett-Packard Development Company, L.P., et al., and entitled Portable Computing System Docking Security System and Method.
Translation of DE Office Action dated Jan. 20, 2010, pp. 2.
CN Office Action, Appln No. 200880002975.0,Date Mailed Oct. 27, 2010, pp. 7.
German Office Action, Appln No. 112008000135.9, Date Mailed Oct. 13, 2010, pp. 5.
State Intellectual Property Office, P.R. China office action dated Jun. 12, 2010, pp. 6.
Translation of State Intellectual Property Office, P.R. China office action dated Jun. 12, 2010, pp. 12.
Intellectual Property Office, Patents Directorate, Patents Act 1977: Examination Report under Section 18(3), Appln No. 0912773.9, date of mailing Dec. 15, 2010, pp. 2.

* cited by examiner

*Primary Examiner* — Edward Zee

(57) ABSTRACT

A portable computing system docking security system comprises a security module disposed in the portable computing system and configured to detect an undocking of the portable computing system from a docking station, the security module configured to automatically determine whether the undocking is an unauthorized undocking event.

15 Claims, 2 Drawing Sheets

PORTABLE COMPUTING SYSTEM DOCKING SECURITY SYSTEM AND METHOD

BACKGROUND OF THE INVENTION

Portable computing devices, such as notebook computers and personal digital assistants, are often connected to docking stations to facilitate charging of internal batteries and/or connecting the portable computing device to external devices and communication lines. However, because of the portable nature of such computing devices, the computing devices are subject to theft if left unattended. In an effort to reduce the likelihood of theft of such computing devices, docking stations are typically equipped with a lockable release device, such as a latch operated by an eject button or lever, such that the lock is used to prevent the release device from being actuated. However, docking stations may be broken, especially if constructed from plastic materials, thereby rendering the lockable release device ineffective for safeguarding the portable computing device.

BRIEF DESCRIPTION OF THE DRAWINGS

For a more complete understanding of the present invention, the objects and advantages thereof, reference is now made to the following descriptions taken in conjunction with the accompanying drawings, in which.

DETAILED DESCRIPTION OF THE DRAWINGS

Figure 1:
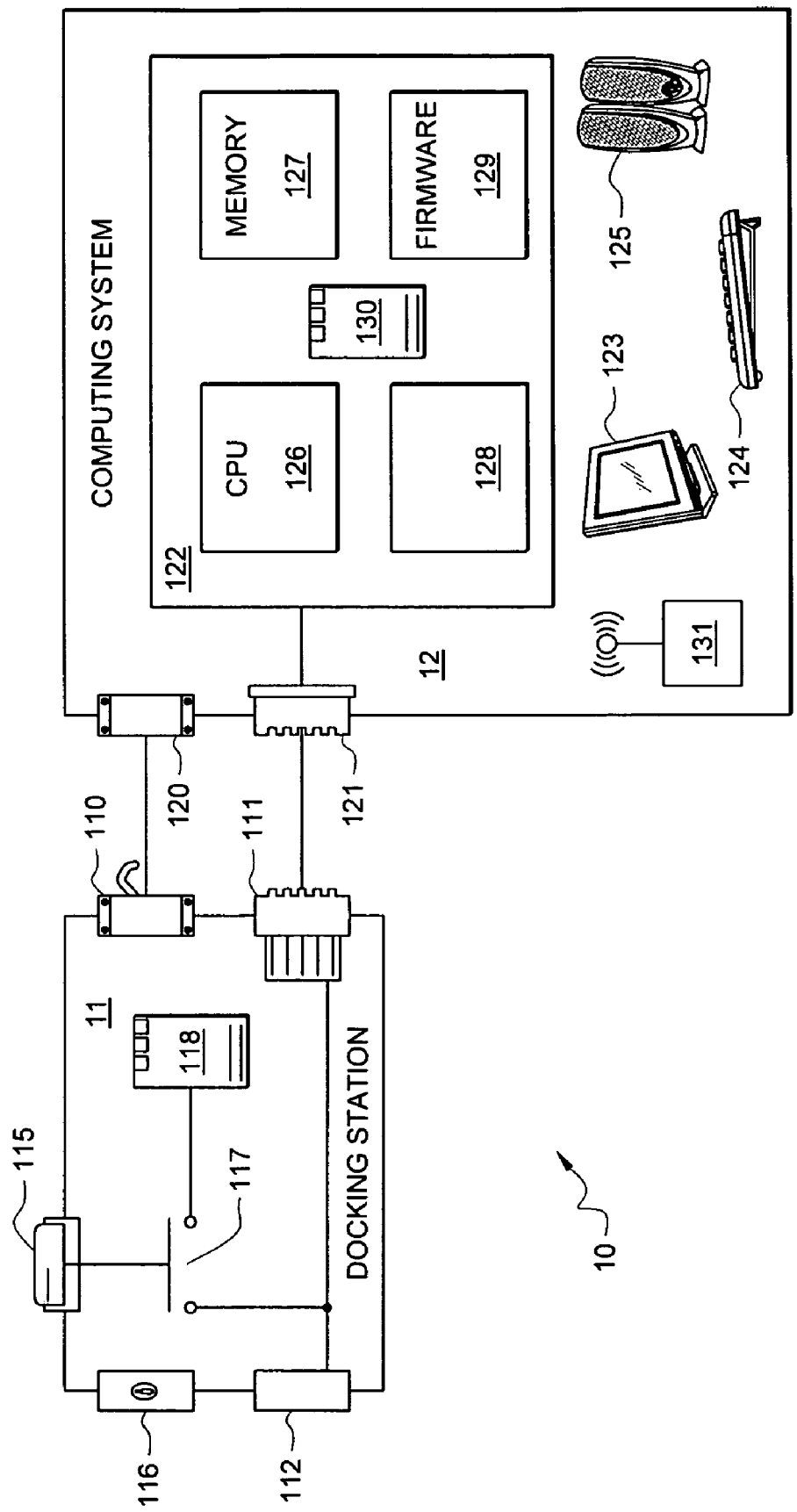
FIG. 1 is a block diagram illustrating an embodiment of a portable computing system docking security system.

FIG. 1 is a diagram illustrating an embodiment of a portable computing system docking security system 10. System 10 is configured to automatically determine and/or otherwise detect an unauthorized undocking of a portable computing system from a docking station. In the embodiment illustrated in FIG. 1, system 10 comprises a docking station 11 and a computing system 12 couplable thereto. Computing system 12 may comprise any type of computing system such as, but not limited to, a notebook computer, personal digital assistant (PDA), or gaming device. In some embodiments, docking station 11 provides computing system 12 with a source of external power, ports for connecting computing system 12 to a network and/or external devices, and/or other docking-related features. In the embodiment illustrated in FIG. 1, docking station 11 comprises a coupling mechanism 110 and a communication port 111. In some embodiments, coupling mechanism 110 comprises a hook, latch or other type of mechanism for physically coupling computing system 12 to docking station 11. Communication port 111 enables communicative coupling of computing system 12 to docking station 11 to facilitate data and/or power and/or other types of communicative exchange between computing system 12 and docking station 11. In operation, when computing system 12 is connected or docked to docking station 11, coupling mechanism 110 engages a corresponding coupling mechanism 120 on computing system 12, and communication port 111 communicatively engages a corresponding communication port 121 on computing system 12. Removing or undocking computing system 12 from docking station 11 results in decoupling mechanism 110 from mechanism 120 and decoupling port 111 from port 121, thereby resulting in a communicative disengagement of computing system 12 from docking station 11.

In the embodiment illustrated in FIG. 1, docking station 11 also comprises an external connection port 112, a release device 115, and a locking mechanism 116. External port 112 enables connecting docking station 11 to external devices and/or networks such as, but not limited to, a mouse, keyboard, display screen, printer, speakers, microphone, and the Internet via Universal Serial Bus (USB), Ethernet, or other types of wired and/or wireless communication protocols. In some embodiments, external port 112 also enables coupling of docking station 11 to an external power source such as an alternating current (AC) power source. In FIG. 1, external port 112 is shown as coupled to communication port 111 for providing computing system 12 with AC power and a communication path to any devices or networks connected to external port 112.

Release device 115 is configured to enable disengagement of coupling mechanism 110 from coupling mechanism 120. In some embodiments, release device 115 comprises an eject button or an eject lever; however, it should be understood that other methods or mechanisms may be used to facilitate disengagement of coupling mechanism 110 from coupling mechanism 120. Locking mechanism 116 is used to secure computing system 12 to docking station 11. For example, in the embodiment illustrated in FIG. 1, locking mechanism 116 is coupled to release device 115 to prevent operation and/or actuation of release device 115 when locking mechanism 116 is in a locked position. In some embodiments, locking mechanism 116 operates by obstructing the movement of release device 115, thereby preventing the disengagement of coupling mechanism 110 from coupling mechanism 120. In some embodiments, locking mechanism comprises a key-operated lever or bar, however, it should be understood that other types or methods and/or mechanisms may be used to prevent operation of release device 115 and/or otherwise secure computing system 12 to docking station 11.

Embodiments of system 10 enable the automatic detection of an unauthorized removal or undocking event of computing system 12 from docking station 11. For example, in the embodiment illustrated in FIG. 1, system 10 comprises a sensor 117 disposed on docking station 11 to sense and/or otherwise detect the operation and/or actuation of release device 115 to disengage or decouple computing system 12 from docking station 11. In the embodiment illustrated in FIG. 1, sensor 117 is shown as coupled to release device 115; however, it should be understood that the coupling of sensor 117 to release device 115 need not be a physical coupling (e.g., any method for sensing the movement and/or operation of release device 115 may be used such as, but not limited to, magnetic or optical sensing or a physical sensing). For example, in some embodiments, sensor 117 comprises a switch that is triggered in response to movement and/or the actuation of release device 115. In some embodiments, docking station 11 is configured to transmit a signal to a security module 128 in computing system 12 indicating that release device 115 has been actuated. The processing of the signal received by security module 128 from sensor 117, or a lack thereof, is described in further detail below for detecting an unauthorized removal or undocking event of computing system 12 from docking station 11. In some embodiments, the signal from sensor 117 is an electrical signal or comprises a circuit that changes impedance. For example, the signal from sensor 117 may be a switch opening or closing to either introduce or bypass an impedance or change a voltage. In some embodiments, the signal from sensor 117 comprises an encoded message. In some embodiments, sensor 117 may send a signal wirelessly to a wireless module 131 of computing system 12, which is coupled to security module 128.

In the embodiment illustrated in FIG. 1, sensor 117 is also coupled to external port 112 and communication port 111. In some embodiments, sensor 117 uses external power received from external port 112 for operation. Sensor 117 may also be in communication with an external security monitoring device through external port 112. Sensor 117 is configured to communicate with security module 128 in computing system 12 through communication port 111 and/or wirelessly. In the embodiment illustrated in FIG. 1, docking station 11 also comprises a battery 118 usable to power sensor 117. Thus, for example, in the event that an external power source is disconnected from docking station 11 before attempting to remove computing system 12 from docking station 11, battery 118 provides electrical power to sensor 117.

In FIG. 1, computing system 12 comprises a circuit board 122, a display 123, a keyboard 124, speakers 125, and a wireless module 131. Circuit board 122 may comprise a single board or multiple boards. Circuit board 122 is coupled to communication port 121 to enable one or more components or modules on circuit board 122 to communicate with one or more components or modules in docking station 11. In the embodiment illustrated in FIG. 1, circuit board 122 comprises at least one central processing unit (CPU) 126, a memory 127, security module 128, firmware 129, and a battery 130. In some embodiments, memory 127 comprises both volatile memory and non-volatile memory, including permanent storage. Memory 127 is preferably configured to hold and/or store logic and data relating to security measures and, in some embodiments, contain at least part of security module 128. Firmware 129 preferably comprises non-volatile memory and integrated circuits (ICs) that also hold and/or store logic and data relating to security measures and, in some embodiments, contain at least part of security module 128. Battery 130 is used to power items in firmware 129, such as a real time clock, and may also be used to supply power to security module 128 in order to provide security functionality when no other power source is providing power to computing system 12.

Security module 128 may comprise hardware, software, firmware, or a combination thereof. Security module 128 is configured to detect and/or otherwise identify removal of computing system 12 from docking station 11. For example, in some embodiments, security module 128 is configured to detect removal of computing system 12 from docking station 11 by detecting communicative decoupling of computing system 12 from docking station 11. For example, in some embodiments, security module 128 monitors signals received via communication port 121 from communication port 111 and interprets an interruption as a disconnection of the ports 111 and 121 (e.g., detecting an interruption or disconnection from external power). In some embodiments, communication port 111 comprises a set of connectors with a loopback circuit such that breakage of the loopback circuit indicates removal of computing system 12 from docking station 11. Alternatively or additionally, security module 128 may be configured to detect removal of computing system 12 from docking station 11 by detecting physical decoupling of computing system 12 from docking station 11 (e.g., via physical separation of a switch mechanism, disengagement of coupling mechanism 110 from coupling mechanism 120, etc.).

In some embodiments, in response to security module 128 detecting decoupling and/or undocking of computing system 12 from docking station 11, security module 128 determines whether the undocking event was an unauthorized undocking. For example, in some embodiments, if locking mechanism 116 is in a locked position, thereby preventing operation of release device 115, and if computing system 12 is removed and/or undocked from docking station 11 without actuation of release device 115 (e.g., in response to any part of docking station 11 or computing system 12 being damaged in order to forcibly remove computing system 12 from docking station 11), sensor 117 does not transmit a signal indicating the operation of release device 115 to security module 128. In some embodiments, security module 128 identifies and/or considers the undocking as unauthorized because no signal from sensor 117 is received by security module 128. In some embodiments, in response to detecting undocking of computing system 12 from docking station 11, security module 128 determines whether the undocking event was preceded by a signal from sensor 117. If not, the undocking event is treated by security module 128 as being unauthorized.

In some embodiments, in response to detecting and/or receiving a signal from sensor 117 indicating actuation of release device 115, security module 128 initiates a count-down timer. If security module 128 detects an undocking of portable computing system 12 from docking station 11 during the time period of the count-down timer, security module 128 interprets the undocking as an authorized undocking event. However, if security module 128 detects an undocking of portable computing system 12 from docking station 11 after expiration of the count-down time period, security module 128 interprets the undocking as an unauthorized undocking event. Thus, for example, if the count-down time period is five seconds, and security module 128 detects an undocking without having detected a signal from sensor 117 within the five seconds immediately prior to the undocking, security module 128 identifies the undocking as an unauthorized undocking event. Further, in some embodiments, security module 128 identifies an attempt to remove computing system 12 from docking station 11 as an unauthorized removal if external power is not supplied to computing system 12 through docking station 11 at the time of removal.

In some embodiments, CPU 126 and/or security module 128 responds to unauthorized undocking events by initiating one or more security measures such as, but not limited to, halting operation of computing system 12, modifying the contents of memory 127 and/or firmware 129, and/or producing an alarm signal. In some embodiments, halting operation of computing system 12 includes blocking user access by locking computing system 12 until a password or other type of authorization is entered, logging out users who were logged in at the time of removal, and powering off computing system 12. In some embodiments, modifying the contents of memory 127 and/or firmware 129 include deleting data, encrypting data, and/or modifying a subsequent boot-up process of computing system 12 to lock computing system 12 and prevent operation of computing system 12 until an administrator or other type of authorization password is provided. In some embodiments, producing an alarm signal includes displaying a visual alarm on display 123, playing an audio signal on speakers 125, and sending a message, such as an email, to a remote device or service, such as a network administrator, a security service, or a previously-identified PDA using wireless module 131. It should be understood that other security measures may also be employed to either draw attention to the undocking event and/or otherwise render one or more features or functions of computing system 12 inoperable and/or inaccessible.

Thus, security module 128 comprises logic and/or data for detecting the unauthorized undocking of computing system 12 from docking station 11 by monitoring electrical and/or physical decoupling of computing system 12 from docking station 11 (e.g., monitoring signals, such as external power, a network connection signal, or signals originating from docking station 11, or monitoring a connection to sensor 117 or battery 118). Security module 128 also comprises logic and/or data for initiating and/or otherwise causing security measures to be implemented in response to detecting an unauthorized undocking event. Security module 128 may be a standalone module or may be implemented in instructions and logic in memory 127 and firmware 129.

Figure 2:
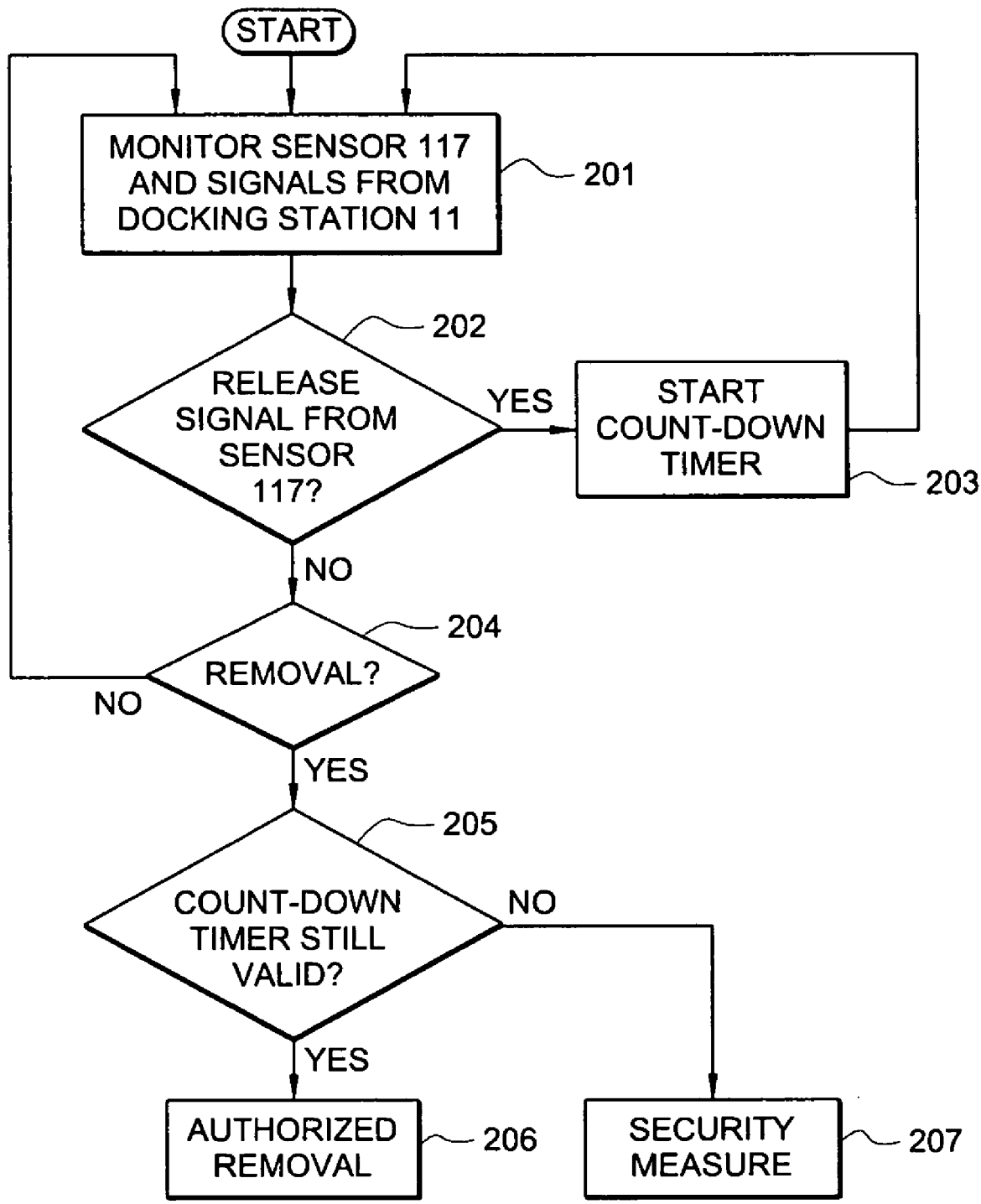
FIG. 2 is a flow diagram illustrating an embodiment of a portable computing system docking security method.

FIG. 2 is a flow diagram illustrating an embodiment of a portable computing system docking security method 200 for detecting unauthorized undocking of computing system 12 from docking station 11. In the embodiment illustrated in FIG. 2, computing system 12 is connected to docking station 11, and locking mechanism 116 is locked or disposed in a locked position. At block 201, security module 128 monitors connections between docking station 11 and computing system 12 for indications that computing system 12 is being removed or undocked from docking station 11 and monitors for the receipt of a signal from sensor 117. At decision block 202, a determination is made by security module 128 whether a signal from sensor 117 is received indicating actuation of release device 115. If a signal from sensor 117 was received, the method proceeds to block 203, where security module 128 initiates a count-down timer. The method proceeds to block 201 where security module 128 continues monitoring connections between docking station 11 and computing system 12 for indications that computing system 12 is being removed or undocked from docking station 11.

If at decisional block 202 it is determined that a signal from sensor 117 was not received, the method proceeds to decision block 204, where a determination is made by security module 128 whether an undocking event is detected. If an undocking event is not detected, the method proceeds to block 201 where security module 128 continues to monitor connections between docking station 11 and computing system 12 for indications that computing system 12 is being removed or undocked from docking station 11 and for the receipt of a signal from sensor 117. If an undocking event is detected at decision block 204, the method proceeds to decision block 205, where a determination is made whether the count-down timer is still valid (i.e., whether the time period for the count-down timer has yet to expire). If the count-down timer is still valid, the undocking event is interpreted as an authorized docking event, as indicated at block 206. If the count-down timer is not valid, the undocking is considered an unauthorized docking event and a security measure is initiated, as indicated at block 207.

It should be understood that in the described methods, certain functions may be omitted, accomplished in a sequence different from that depicted in FIGS. 2 and 3, or simultaneously performed. Also, it should be understood that the methods depicted in FIGS. 2 and 3 may be altered to encompass any of the other features or aspects of the invention as described elsewhere in the specification. Further, embodiments of the present invention may be implemented in software and can be adapted to run on different platforms and operating systems. In particular, functions implemented by security module 128, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. A system comprising:
a portable computing system and a docking station;
a security module disposed in the portable computing system and operable under control of a processor;
the docking station including a sensor powered independently of a power supply of the portable computing system, the sensor configured to detect actuation of a release device that facilitates physical disengagement of the portable computing system from the docking station, the docking station configured to transmit a signal from the sensor to the portable computing system, the signal indicating actuation of the release device; and
the security module storing instructions executable by a processor for detection of physical disengagement of the portable computing system from the docking station, to automatically determine whether the physical disengagement is an unauthorized undocking event, including an unauthorized undocking event comprising physical disengagement of the portable computing system from the docking station without actuation of the release device.

2. The system of claim 1 wherein the physical disengagement comprises undocking of the portable computing system from the docking station, and wherein the security module detects physical disengagement without reliance on the signal indicating actuation of the release device.

3. The system of claim 1 wherein execution of the security module instructions initiates a security measure in response to determining an unauthorized undocking event.

4. The system of claim 1 wherein execution of the security module instructions in response to determining an unauthorized docking event, initiates at least one of: halting operation of the portable computing system, modifying contents of a non-volatile memory of the portable computing system, modifying a subsequent boot process of the portable computing system, producing an audible signal, or transmitting a security message to a remote service.

5. The system of claim 1 wherein the security module detection of physical disengagement comprises to detect undocking of the portable computing system from the docking station based on communicative decoupling of the portable computing system from the docking station.

6. The system of claim 1 wherein the security module detects physical disengagement in an absence of the signal from the sensor.

7. The system of claim 1 wherein the security module also includes instructions executable in response to detecting a loss of external power to the docking station, to determine an unauthorized undocking event.

8. A system comprising:
a portable computing means and a docking means;
the docking means including means for sensing actuation of a means for releasing the portable computing means from the docking means, wherein the means for sensing is powered independently of a power supply for the portable computing means, and wherein the docking means is configured to transmit a signal to the portable computing means indicating actuation of the means for releasing; and the portable computing means comprising means for security that stores processor executable instructions to detect undocking of the portable computing means from the docking means, and to determine unauthorized undocking events including an unauthorized undocking event of the portable computing means being undocked from the docking means in absence of the signal indicating actuation of the means for releasing.

9. The system of claim 8 further comprising means for initiating a security measure in the portable computing means in response to determining an unauthorized undocking event.

10. The system of claim 8 wherein the unauthorized undocking events include an unauthorized undocking event comprising undocking without actuation of the means for releasing.

11. The system of claim 8 wherein the unauthorized undocking events include an unauthorized undocking event comprising receipt by the portable computing means of the signal indicating actuation of the means for releasing but with undocking occurring after expiration of a countdown timer.

12. A portable computing system docking security system, comprising:
   a portable computing system;
   a docking station including a sensor powered independently of a power supply of the portable computing system, the sensor configured to detect actuation of a release device that permits mechanically decoupling the portable computing system from the docking station, the docking station configured to transmit a signal to the portable computing system indicating actuation of the release device; and
   the portable computing system including a security module storing instructions executable by a processor to initiate a countdown timer in response to the signal indicating actuation of the release device and to determine an unauthorized undocking event when the portable computing system is undocked after expiration of the countdown timer, and to determine an unauthorized undocking event when the portable computing system is undocked without actuation of the release device.

13. The system of claim 12 wherein the signal indicating actuation of the release device is wirelessly transmitted from the docking station to the portable computing system.

14. The system of claim 12, wherein the security module is configured to identify interruption of a communicative signal received by the portable computing system from the docking station.

15. The system of claim 12, wherein execution of the security module instructions in response to determining an unauthorized docking event initiates at least one of: halting operation of the portable computing system, modifying contents of a non-volatile memory of the portable computing system, modifying a subsequent boot process of the portable computing system, producing an audible signal, or transmitting a security message to a remote service.

* * * * *